United States Patent
Lin et al.

(10) Patent No.: US 10,814,502 B2
(45) Date of Patent: Oct. 27, 2020

(54) ROBOTIC SYSTEM

(71) Applicant: DELTA ELECTRONICS, INC., Taoyuan (TW)

(72) Inventors: Ching-Yu Lin, Taoyuan (TW);
Hung-Sheng Chang, Taoyuan (TW);
Chi-Shun Chang, Taoyuan (TW);
Wen-Ching Chung, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 148 days.

(21) Appl. No.: 16/260,687

(22) Filed: Jan. 29, 2019

(65) Prior Publication Data
US 2020/0101625 A1    Apr. 2, 2020

(30) Foreign Application Priority Data

Sep. 27, 2018    (CN) .......................... 2018 1 1134081

(51) Int. Cl.
*B25J 19/00* (2006.01)
*H02M 3/158* (2006.01)

(52) U.S. Cl.
CPC ....... *B25J 19/0041* (2013.01); *H02M 3/1582* (2013.01)

(58) Field of Classification Search
CPC .. B25J 19/0041; B25J 19/0025; B25J 9/0009; H02M 3/1582
See application file for complete search history.

(56) References Cited

U.S. PATENT DOCUMENTS

| 7,183,745 | B2 * | 2/2007 | Kubale | ..................... B25F 5/02 320/114 |
| 8,041,456 | B1 * | 10/2011 | Blackwell | .............. B25J 9/1674 700/245 |
| 8,784,033 | B2 | 7/2014 | Kremerman et al. | |
| 2002/0175646 | A1 * | 11/2002 | Kushida | ................ A47L 9/2842 318/268 |
| 2005/0040664 | A1 | 2/2005 | Kameda et al. | |
| 2008/0309277 | A1 * | 12/2008 | Sugino | ................... B25J 19/005 318/600 |

(Continued)

FOREIGN PATENT DOCUMENTS

| CN | 103328161 B | 8/2015 |
| CN | 107097222 A | 8/2017 |

(Continued)

*Primary Examiner* — Bickey Dhakal
(74) *Attorney, Agent, or Firm* — Kirton McConkie; Evan R. Witt

(57) ABSTRACT

A robotic system includes a base and at least one axis actuation module. The base includes an input power conversion device. A power input terminal of the input power conversion device receives an input voltage. The input voltage is converted into a first voltage by the input power conversion device. The first voltage is outputted from a power output terminal of the input power conversion device. The at least one axis actuation module is installed on the base. Each axis actuation module includes a motor, an axis power conversion device and a driving device. The first voltage is converted into a second voltage with a rated voltage value by the axis power conversion device. The second voltage is converted into a third voltage by the driving device. The third voltage is provided to the motor.

9 Claims, 9 Drawing Sheets

(56) References Cited

U.S. PATENT DOCUMENTS

2010/0145519 A1* 6/2010 Keyl .................. B25J 9/1674
  700/258
2017/0234484 A1* 8/2017 Vanko .................. H02P 27/08
  173/176

FOREIGN PATENT DOCUMENTS

| CN | 108372501 A | 8/2018 |
| JP | 2017007023 A | 1/2017 |
| TW | 201529256 A | 8/2015 |
| TW | 201817564 A | 5/2018 |
| WO | 2007075844 A1 | 7/2007 |

* cited by examiner

ROBOTIC SYSTEM

FIELD OF THE INVENTION

The present disclosure relates to a robotic system, and more particularly to a robotic system for integrating a power conversion device and a robot.

BACKGROUND OF THE INVENTION

Recently, with the development of mechanisms, automatic control technologies and computer technologies, robots (e.g., robotic arms) have been widely used in various industries. The robotic arm can perform various highly-repetitive tasks in order to automatically produce and assemble the products in the highly-efficient and stable manner.

Conventionally, the robot uses a power conversion device to convert the received electric power into a regulated voltage. The regulated voltage is provided to the main body of the robot. The power conversion device is usually installed in an external electric control box. The power conversion device and the main body of the robot are separate components.

Since the power conversion device is installed in the external electric control box to power the robot, the power conversion device needs a large capacitor to achieve the voltage-stabilizing function and the power conversion device needs a large heat transfer area. Under this circumstance, the volume of the external electric control box is bulky. The bulky volume of the external electric control box is detrimental to the portability of the conventional robot. Moreover, an output terminal of the external electric control box is connected with a bus, and a plurality of rotatable axis actuation modules (i.e., joints) of the conventional robot are connected with the bus in parallel. Conventionally, the power device in each joint is not equipped with any voltage regulator. When the electric power is transmitted from the external electric control box to the axis actuation module, the axis actuation module has a voltage drop. Since the voltage for powering the axis actuation module is possibly insufficient, the axis actuation module cannot be normally operated.

Moreover, in case that the motor of the axis actuation module generates a regeneration power, the regeneration power is consumed by a resistor or other power-consumption element of the conventional robot. That is, the regeneration power generated by the conventional robot cannot be effectively utilized. In case that the motor in the axis actuation module is a low-voltage motor and the external electric control box is maintained at the constant power, a larger driving current is provided to the main body of the robot. Under this circumstance, the diameter of the power cable in the main body of the conventional robot must be thick enough. In other words, it is difficult to design the inner space of the robot for installing the power cable.

Therefore, there is a need of providing a robotic system for integrating a power conversion device and a robot so as to overcome the above drawbacks.

SUMMARY OF THE INVENTION

The present disclosure provides a robotic system to address the above-mentioned issues that the bulky volume of the external electric control box is detrimental to the portability of the conventional robot, the voltage for powering the axis actuation module is possibly insufficient, the regeneration power generated by the motor of the axis actuation module of the conventional robot cannot be effectively utilized, and it is difficult to design the inner space of the robot for installing the power cable.

The present disclosure provides a robotic system for integrating a power conversion device and a robot. Consequently, the regeneration power generated by the motor can be utilized, the space utilization of the robotic system is enhanced, and the installation of the power cable is simplified.

In accordance with an aspect of the present disclosure, there is provided a robotic system. The robotic system includes a base and at least one axis actuation module. The base includes an input power conversion device. A power input terminal of the input power conversion device receives an input voltage. The input voltage is converted into a first voltage by the input power conversion device. The first voltage is outputted from a power output terminal of the input power conversion device. The at least one axis actuation module is installed on the base. Each of the at least one axis actuation module includes a motor, an axis power conversion device and a driving device. The axis power conversion device includes an axis input terminal, a first output terminal and a second output terminal. The axis input terminal receives the first voltage. The first voltage is converted into a second voltage with a rated voltage value by the axis power conversion device. The second voltage is outputted from the first output terminal. The second output terminal is directly connected with the axis input terminal. The first voltage received by the axis input terminal is directly transmitted to the second output terminal. The driving device is electrically connected with the motor and the first output terminal. The second voltage is converted into a third voltage by the driving device. The third voltage is provided to the motor.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
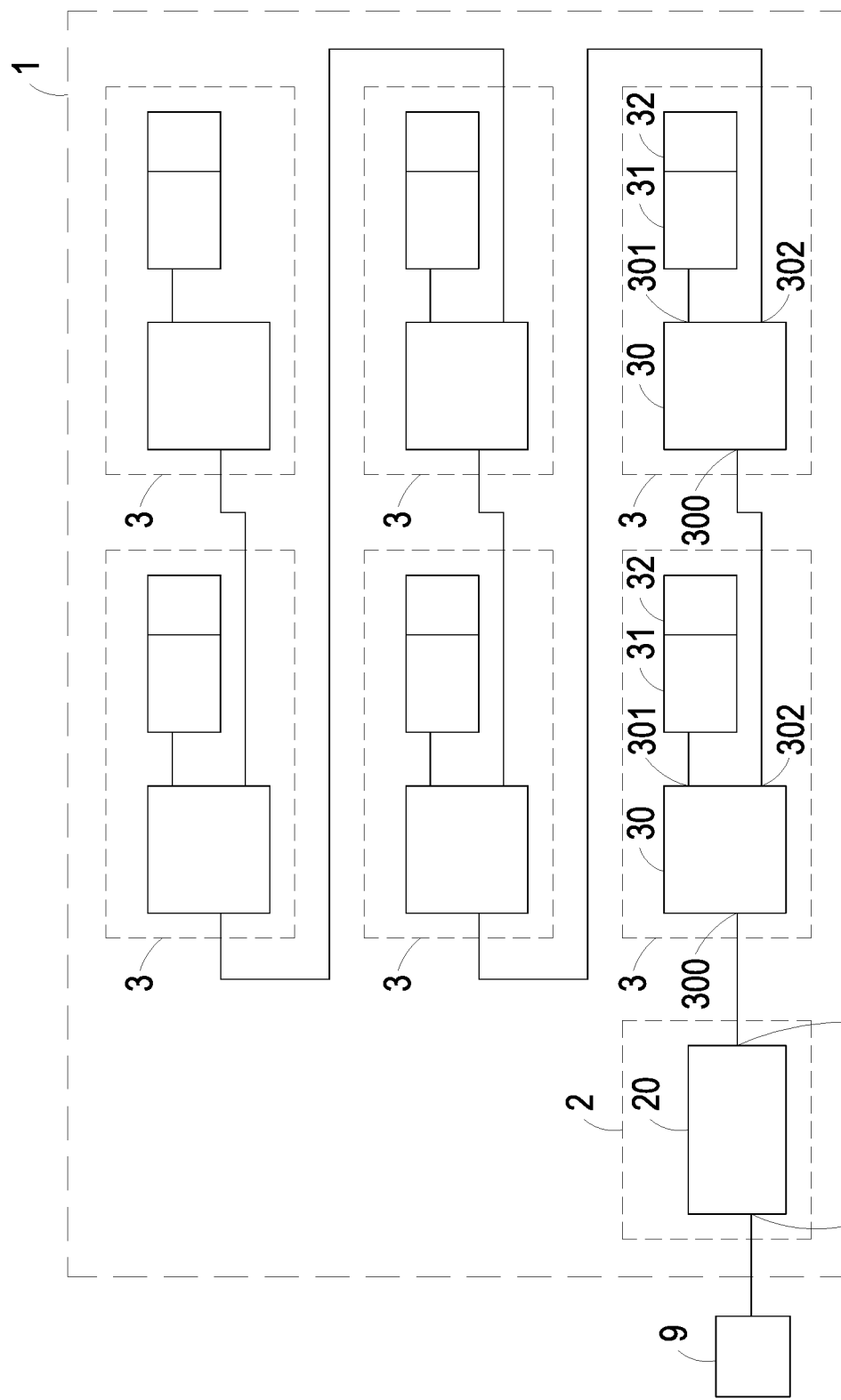
FIG. 1 is a schematic functional block diagram illustrating a robotic system according to a first embodiment of the present disclosure.
Figure 2:
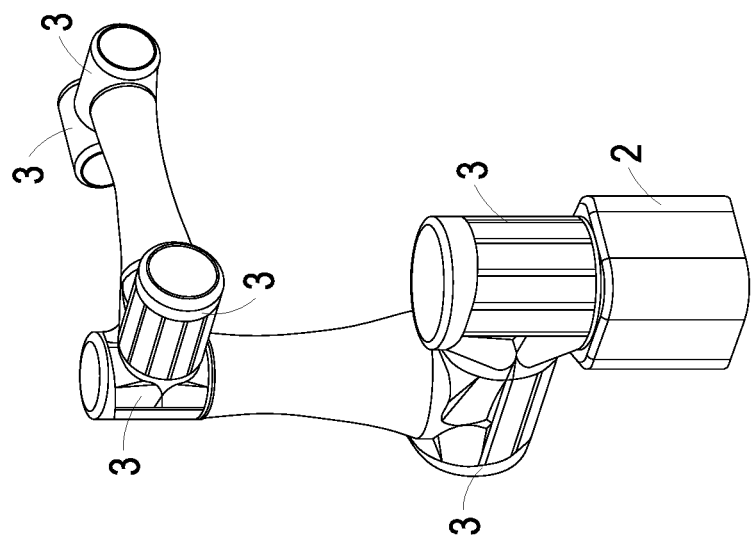
FIG. 2 is a schematic perspective view illustrating the structure of the robotic system as shown in FIG. 1.

Please refer to FIGS. 1 and 2. FIG. 1 is a schematic functional block diagram illustrating a robotic system according to a first embodiment of the present disclosure. FIG. 2 is a schematic perspective view illustrating the structure of the robotic system as shown in FIG. 1. Preferably but not exclusively, the robotic system 1 is a robotic arm. The robotic system 1 includes a base 2 and at least one axis actuation module 3. The at least one axis actuation module 3 is installed on the base 2. The base 2 includes an input power conversion device 20. A power input terminal 205 of the input power conversion device 20 is electrically connected with an input power source 9. By the input power conversion device 20, an input voltage U (see FIG. 4A) from the input power source 9 is converted into a first voltage V1 (see FIG. 4A). The first voltage V1 is outputted from a power output terminal 206 of the input power conversion device 20.

In this embodiment, as shown in FIGS. 1 and 2, the robotic system 1 includes six axis actuation modules 3. The six axis actuation modules 3 are located at the corresponding joints of the robotic system 1. Moreover, every two axis actuation modules 3 are directly connected with each other or indirectly connected with each other through a link arm.

Each axis actuation module 3 includes an axis power conversion device 30, a driving device 31 and a motor 32. The motor 32 is electrically connected with the driving device 31. When the motor 32 is driven by the driving device 31, the corresponding joint is rotated. In this embodiment, the motor 32 is a non-hollow motor without a hollow structure. The axis power conversion device 30 includes an axis input terminal 300, a first output terminal 301 and a second output terminal 302. The axis input terminal 300 receives the first voltage V1. The first output terminal 301 is electrically connected with the driving device 31. In case that the axis actuation module 3 is connected with an adjacent axis actuation module 3, the second output terminal 302 of the axis power conversion device 30 is electrically connected with the axis input terminal 300 of the axis power conversion device 30 of the adjacent axis actuation module 3. By the axis power conversion device 30, the first voltage V1 is converted into a second voltage V2 with a rated voltage value. The second voltage V2 is outputted from the first output terminal 301. Moreover, the second output terminal 302 is directly connected with the axis input terminal 300. Consequently, the first voltage V1 is transmitted from the axis input terminal 300 to the second output terminal 302, and then transmitted to the axis input terminal 300 of the axis power conversion device 30 of the adjacent axis actuation module 3. By the driving device 31, the second voltage V2 from the axis power conversion device 30 is converted into a third voltage. Then, the third voltage is provided to the motor 32.

As mentioned above, the input power conversion device 20 is installed in the base 2, and the axis power conversion devices 30 are included in the axis actuation modules 3 of the robotic system 1. The input power conversion device 20 and the axis power conversion devices 30 are used for converting the electric power into the regulated voltages. In other words, the robotic system 1 integrates the input power conversion device 20 with the robot. Since it is not necessary to install the input power conversion device in the external electric control box, the robotic system 1 is suitable for the portable applications. Moreover, each axis actuation module 3 of the robotic system 1 is equipped with the axis power conversion device 30 for converting the first voltage V1 into the second voltage V2 with the rated voltage value. Since the axis power conversion device 30 provides a voltage-stabilizing function, the voltage for powering each axis actuation module 3 is sufficient.

In an embodiment, the first voltage V1 and the second voltage V2 are DC voltages. Moreover, the magnitude of the first voltage V1 is larger than the magnitude of the second voltage V2. The axis input terminal 300 of the axis power conversion device 30 of one axis actuation module 3 is electrically connected with the power output terminal 206 of the input power conversion device 20 to receive the first voltage V1 from the input power conversion device 20. The axis input terminal 300 of the axis power conversion device 30 of each of the other axis actuation modules 3 is electrically connected with the second output terminal 302 of the previous axis actuation module 3 to receive the first voltage V1. In an embodiment, the input power conversion device 20 further includes a power isolator (not shown) such as a transformer, and the axis power conversion device 30 is not equipped with the power isolator.

Figure 3A:
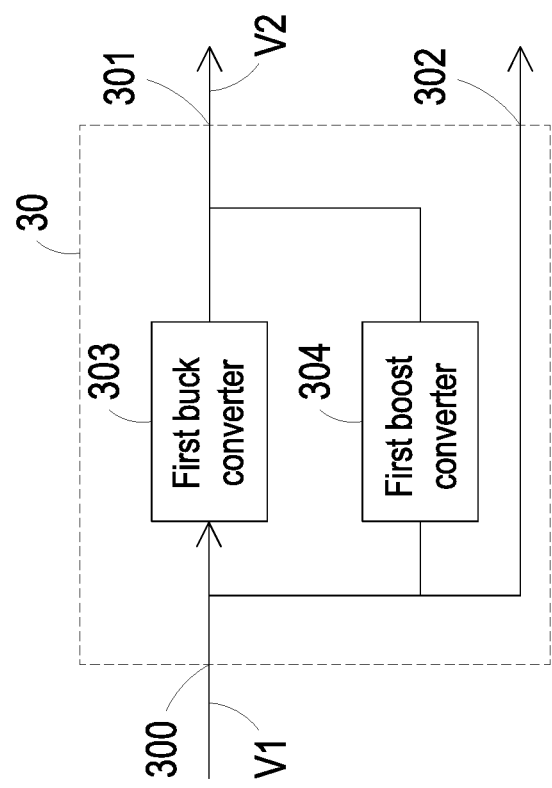
FIG. 3A is a schematic circuit block diagram illustrating the axis power conversion device of the robotic system as shown in FIG. 1 and operated in a first situation.
Figure 3B:
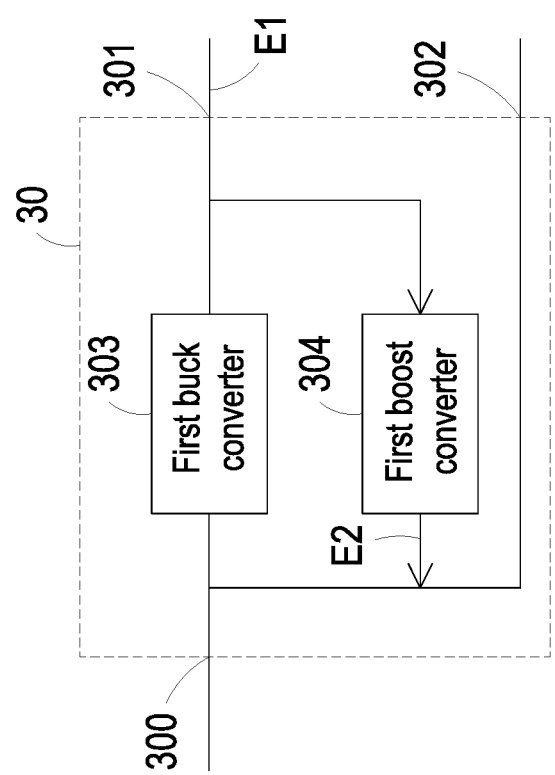
FIG. 3B is a schematic circuit block diagram illustrating the axis power conversion device of the robotic system as shown in FIG. 1 and operated in a second situation.

Please refer to FIGS. 3A and 3B. FIG. 3A is a schematic circuit block diagram illustrating the axis power conversion device of the robotic system as shown in FIG. 1 and operated in a first situation. FIG. 3B is a schematic circuit block diagram illustrating the axis power conversion device of the robotic system as shown in FIG. 1 and operated in a second situation. The axis power conversion device 30 includes a first buck converter 303 and a first boost converter 304.

Please refer to FIG. 3A. The first buck converter 303 is electrically connected between the axis input terminal 300 and the first output terminal 301 of the axis power conversion device 30. By the first buck converter 303, the first voltage V1 from the axis input terminal 300 is decreased and the second voltage V2 with the rated voltage value is outputted from the first output terminal 301. In case that the axis input terminal 300 of the axis power conversion device 30 is electrically connected with the power output terminal 206 of the input power conversion device 20, the first buck converter 303 receives the first voltage V1 from the input power conversion device 20. In case that the axis input terminal 300 of the axis power conversion device 30 is electrically connected with the second output terminal 302 of the previous axis actuation module 3, the first buck converter 303 receives the first voltage V1 from the second output terminal 302 of the previous axis actuation module 3. By the first buck converter 303, the first voltage V1 is converted into the second voltage V2 with the rated voltage value. Since the first buck converter 303 provides a voltage-stabilizing function, the voltage for powering each axis actuation module 3 is sufficient.

Please refer to FIG. 3B. The first boost converter 304 is electrically connected between the axis input terminal 300 and the first output terminal 301 of the axis power conversion device 30. The first boost converter 304 is also electrically connected with the second output terminal 302 of the axis power conversion device 30. In a situation (e.g., a brake situation of the motor 32), a first regeneration power E1 is provided from the driving device 31 to the first output terminal 301. When the first regeneration power E1 is provided to the first output terminal 301, the first regeneration power E1 is converted into a second regeneration power E2 by the first boost converter 304. Then, the second regeneration power E2 is transmitted to the axis input terminal 300 of the axis power conversion device 30 (see FIG. 3B). In such way, the first regeneration power E1 is recycled, and the regeneration power of the motor 32 is effectively utilized. The voltage of the first regeneration power E1 is lower than the voltage of the second regeneration power E2.

Please refer to FIGS. 3A and 3B again. When the first buck converter 303 is enabled, the first boost converter 304 is disabled. When the first boost converter 304 is enabled, the first buck converter 303 is disabled.

Figure 4A:
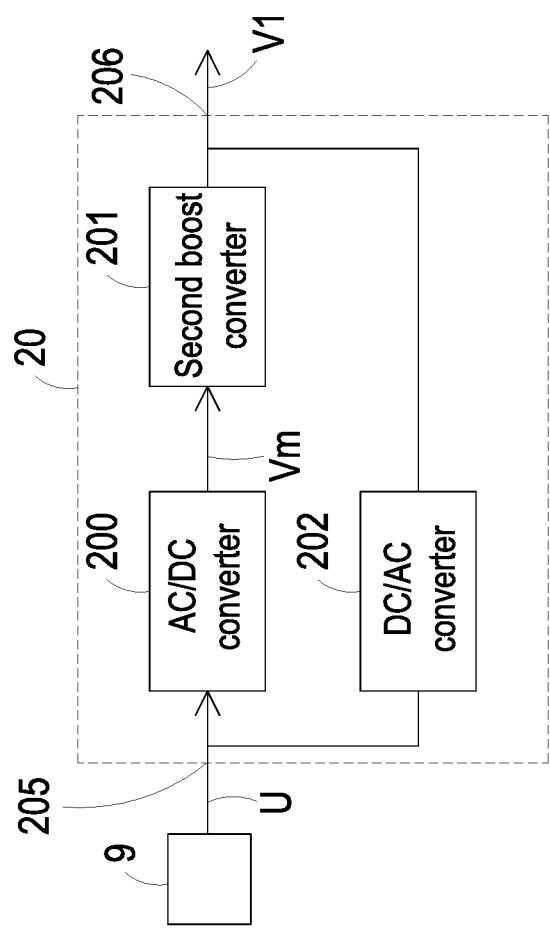
FIG. 4A is a schematic circuit block diagram illustrating an example of the input power conversion device of the robotic system as shown in FIG. 1 and operated in the first situation.
Figure 4B:
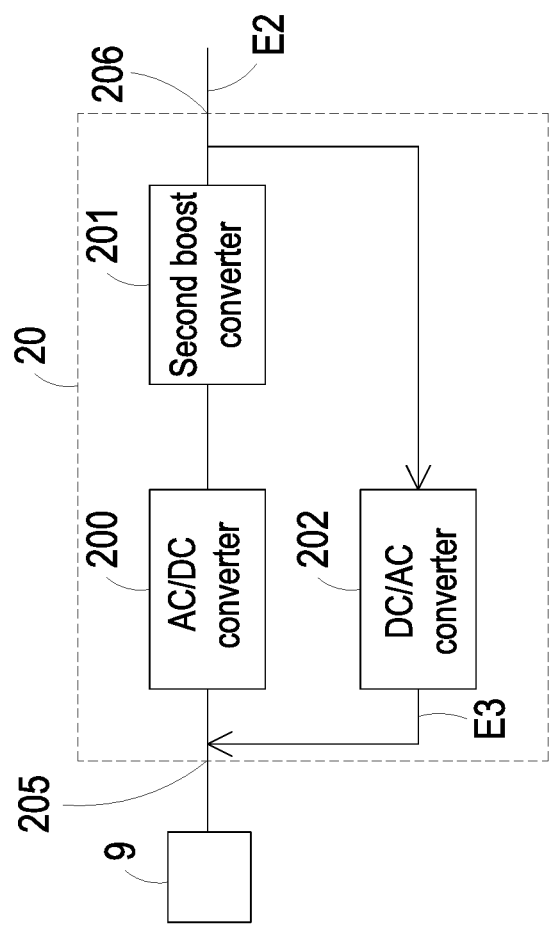
FIG. 4B is a schematic circuit block diagram illustrating an example of the input power conversion device of the robotic system as shown in FIG. 1 and operated in the second situation.

Please refer to FIGS. 4A and 4B. FIG. 4A is a schematic circuit block diagram illustrating an example of the input power conversion device of the robotic system as shown in FIG. 1 and operated in the first situation. FIG. 4B is a schematic circuit block diagram illustrating an example of the input power conversion device of the robotic system as shown in FIG. 1 and operated in the second situation. In this embodiment, the input power source 9 is an AC power source (e.g., a utility power source), and the input voltage U is an AC voltage. The input power conversion device 20 includes an AC/DC converter 200, a second boost converter 201 and a DC/AC converter 202.

Please refer to FIG. 4A. The AC/DC converter 200 is electrically connected between the power input terminal 205 of the input power conversion device 20 and the second boost converter 201. By the AC/DC converter 200, the input voltage U from the power input terminal 205 of the input power conversion device 20 is converted into a transition DC voltage Vm. The transition DC voltage Vm is provided to the second boost converter 201. The second boost converter 201 is electrically connected between the AC/DC converter 200 and the power output terminal 206 of the input power conversion device 20. By the second boost converter 201, the transition DC voltage Vm is increased to the first voltage V1 (i.e., a DC voltage). The first voltage V1 is provided to the power output terminal 206 of the input power conversion device 20. The magnitude of the first voltage V1 is equal to or larger than the transition DC voltage Vm.

Please refer to FIG. 4B. The DC/AC converter 202 is electrically connected between the power input terminal 205 and the power output terminal 206 of the input power conversion device 20. If the second regeneration power E2 from the first boost converter 304 of the axis power conversion device 30 of the axis actuation module 3 and received by the power output terminal 206 of the input power conversion device 20 is larger than a threshold value, the second regeneration power E2 is decreased and converted into a third regeneration power E3 by the DC/AC converter 202. For example, the threshold value is equal to the magnitude of the first voltage V1. Then, the third regeneration power E3 is provided to the power input terminal 205 of the input power conversion device 20. Consequently, the third regeneration power E3 is recycled to the input power source 9, and the second regeneration power E2 is effectively utilized.

Please refer to FIGS. 4A and 4B again. When the AC/DC converter 200 and the second boost converter 201 are enabled, the DC/AC converter 202 is disabled. When the DC/AC converter 202 is enabled, the AC/DC converter 200 and the second boost converter 201 are disabled.

In this embodiment, the second boost converter 201 of the input power conversion device 20 is used for increasing the magnitude of the transition DC voltage Vm to the first voltage V1. The first voltage V1 is provided to the axis power conversion device 30 of each axis actuation module 3. Then, the first voltage V1 is decreased to the second voltage V2 by the axis power conversion device 30. Consequently, the motor 32 of the robotic system 1 is a low-voltage motor.

Since the magnitude of the input voltage U is increased by the input power conversion device 20, the diameters of most power cables in the robotic system 1 (e.g., the power cable between the input power conversion device 20 and the axis actuation module 3 and the power cable between every two adjacent axis actuation modules 3) may be reduced. For example, the motor power in the axis actuation module 3 is 400 W. In case that the low voltage of 48V is provided to the axis actuation module of the conventional robot, the current is about 8.33 Amp and the power cable of the conventional robot is a solid conductor with a diameter of about 1.2950 mm. In accordance with the present disclosure, the first voltage provided to the axis actuation module 3 is increased to for example 156V by the second boost converter 201. That is, the voltage of 156V is provided to the axis actuation module 3, and the current is about 2.56 Amp. The diameters of most power cables in the robotic system 1 is reduced to about 0.7240 mm. When compared with the conventional robot, the diameter of the power cable in the robotic system 1 of the present disclosure is decreased from 1.2950 mm to 0.7240 mm. That is, the diameter reduction of the power cable of the robotic system 1 is 44.09% (i.e., (1.295−0.724)/1.295=44.09%. In case that the motor power is increased, the difference between the diameter of the power cable of the robotic system 1 and the diameter of the power cable of the conventional robot is increased. Since the power cable of the robotic system 1 has the smaller diameter, the space utilization of the robotic system 1 is enhanced and the installation of the power cable is simplified.

Figure 5A:
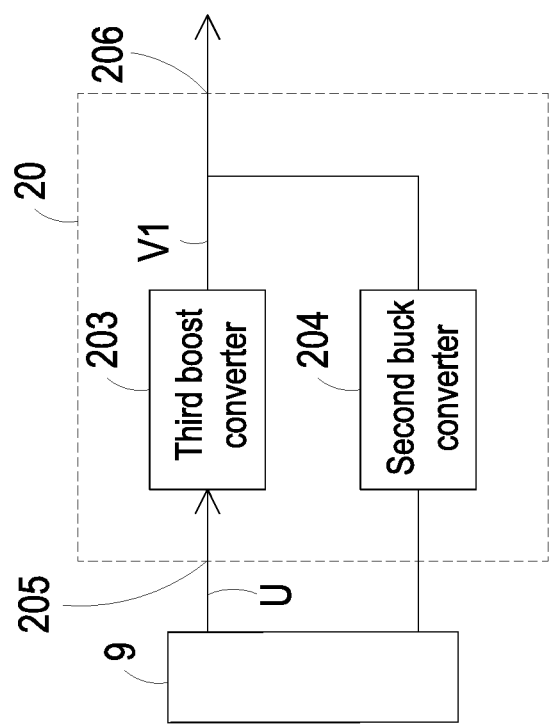
FIG. 5A is a schematic circuit block diagram illustrating another example of the input power conversion device of the robotic system as shown in FIG. 1 and operated in the first situation.
Figure 5B:
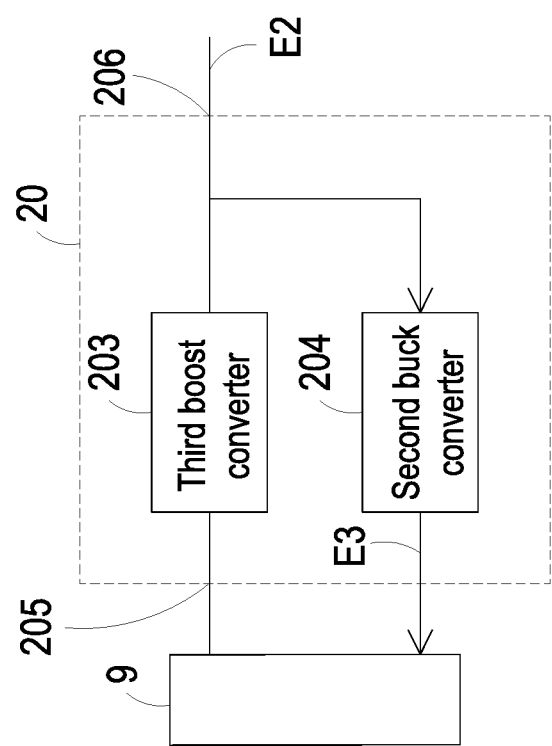
FIG. 5B is a schematic circuit block diagram illustrating another example of the input power conversion device of the robotic system as shown in FIG. 1 and operated in the second situation.

Please refer to FIGS. 5A and 5B. FIG. 5A is a schematic circuit block diagram illustrating another example of the input power conversion device of the robotic system as shown in FIG. 1 and operated in the first situation. FIG. 5B is a schematic circuit block diagram illustrating another example of the input power conversion device of the robotic system as shown in FIG. 1 and operated in the second situation. In this embodiment, the input power source 9 is an energy storage battery, and the input voltage U is a DC voltage. The input power conversion device 20 includes a third boost converter 203 and a second buck converter 204.

Please refer to FIG. 5A. The third boost converter 203 is electrically connected between the power input terminal 205 and the power output terminal 206 of the input power conversion device 20. By the third boost converter 203, the input voltage U from the power input terminal 205 of the input power conversion device 20 is converted into the first voltage V1. The first voltage V1 is provided to the power output terminal 206 of the input power conversion device 20. The magnitude of the first voltage V1 is equal to or larger than the input voltage U.

Please refer to FIG. 5B. The second buck converter 204 is electrically connected between the power input terminal 205 and the power output terminal 206 of the input power conversion device 20. If the second regeneration power E2 from the first boost converter 304 of the axis power conversion device 30 of the axis actuation module 3 and received by the power output terminal 206 of the input power conversion device 20 is larger than a threshold value, the second regeneration power E2 is converted into a third regeneration power E3 (i.e., DC power) by the second buck converter 204. For example, the threshold value is equal to the magnitude of the first voltage V1. Then, the third regeneration power E3 is provided to the power input terminal 205 of the input power conversion device 20 to charge the input power source 9. Consequently, the second regeneration power E2 is effectively utilized.

Please refer to FIGS. 5A and 5B again. When the third boost converter 203 is enabled, the second buck converter 204 is disabled. When the second buck converter 204 is enabled, the third boost converter 203 is disabled.

Figure 6:
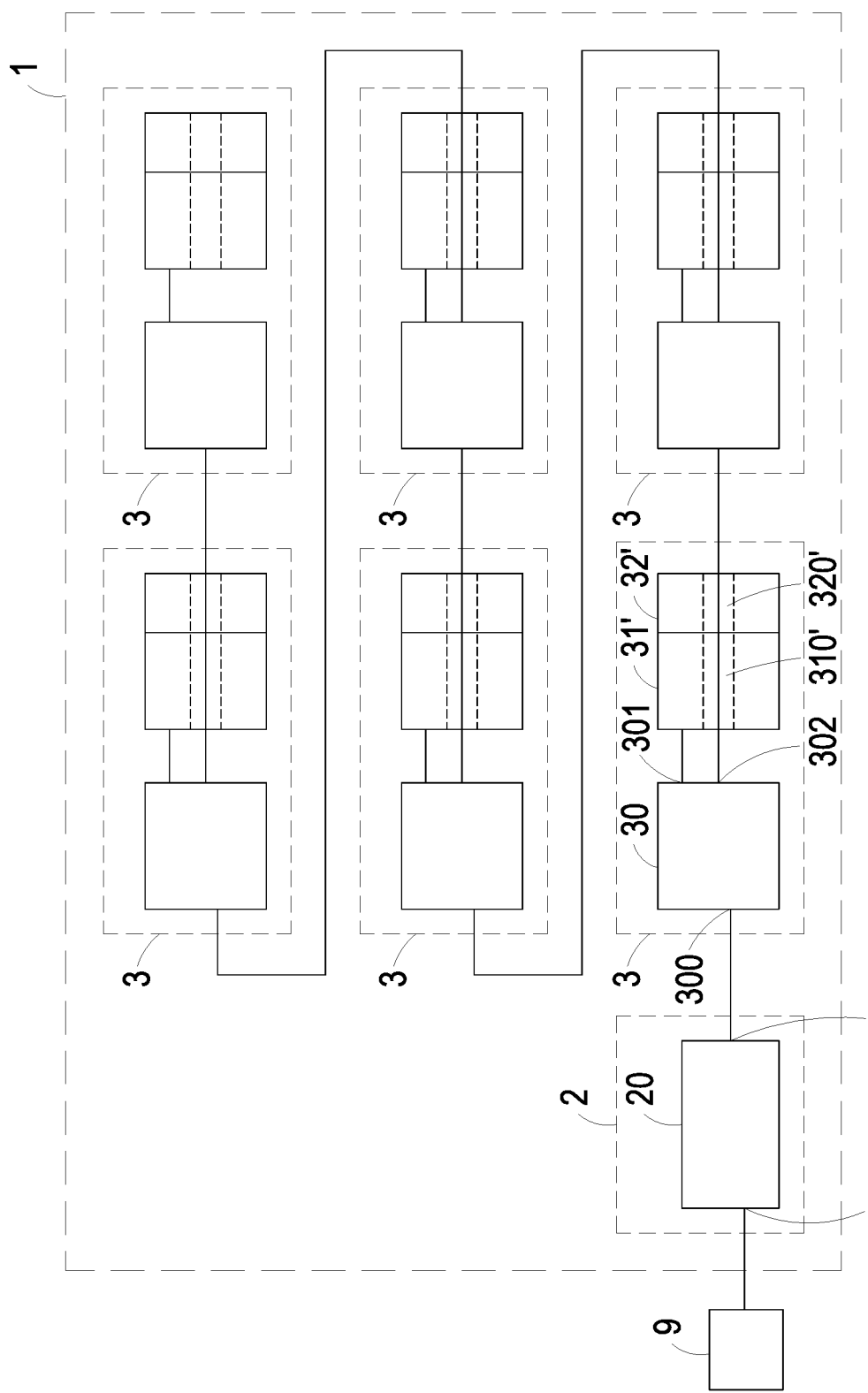
FIG. 6 is a schematic functional block diagram illustrating a robotic system according to a second embodiment of the present disclosure.

FIG. 6 is a schematic functional block diagram illustrating a robotic system according to a second embodiment of the present disclosure. The structures and actions of the robotic system 1 of the second embodiment are similar to the structures and actions of the robotic system 1 of FIG. 1. Component parts and elements corresponding to those of the first embodiment are designated by identical numeral references, and detailed descriptions thereof are omitted. As mentioned above, the motor 32 of the axis actuation module 3 in the first embodiment is a non-hollow motor without a hollow structure. In this embodiment, the motor 32' is a hollow motor with a first hollow structure 320'. The first hollow structure 320' can accommodate at least one cable (e.g., a power cable and/or a signal cable). As shown in FIG. 6, the power cable electrically connected between the second output terminal 302 of the axis power conversion device 30 and axis input terminal 300 of the axis power conversion device 30 of the adjacent axis actuation module 3 is accommodated within the first hollow structure 320'. In another embodiment, the driving device 31' further includes a flexible circuit board. The flexible circuit board is wound as a ring-shaped or semi-ring shaped hollow structure, i.e., a second hollow structure 310'. The second hollow structure 310' can accommodate at least one cable (e.g., a power cable and/or a signal cable). As shown in FIG. 6, the power cable electrically connected between the second output terminal 302 of the axis power conversion device 30 and axis input terminal 300 of the axis power conversion device 30 of the adjacent axis actuation module 3 is accommodated within the second hollow structure 310'.

From the above descriptions, the present disclosure provides a robotic system. The robotic system includes a base and at least one axis actuation module. An input power conversion device is installed in the base. An axis power conversion device is included in the axis actuation module. The input power conversion device and the axis power conversion devices are used for converting the electric power into the regulated voltages so as to power the robotic system. Since it is not necessary to install the input power conversion device in the external electric control box, the robotic system is suitable for the portable applications. Moreover, each axis actuation module of the robotic system is equipped with the axis power conversion device for converting the first voltage into the second voltage with the rated voltage value. Since the axis power conversion device provides a voltage-stabilizing function, the voltage for powering each axis actuation module is sufficient. Moreover, the axis power conversion device includes a first boost voltage, and the input power conversion device includes a DC/AC converter or a second buck converter. By the first boost voltage and the DC/AC converter or the second buck converter, the regeneration power generated by the motor can be effectively recycled. Moreover, the input voltage is converted to the first voltage (i.e., a larger voltage) by the input power conversion device, and the first voltage is provided to the axis power conversion device of each axis actuation module. Then, the first voltage is converted into the second voltage (i.e., a lower voltage) by the axis power conversion device. Consequently, the diameters of most power cables in the robotic system may be reduced. Since the power cable of the robotic system has the smaller diameter, the space utilization of the robotic system is enhanced and the installation of the power cable is simplified.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A robotic system, comprising:
   a base comprising an input power conversion device, wherein a power input terminal of the input power conversion device receives an input voltage, the input voltage is converted into a first voltage by the input power conversion device, and the first voltage is outputted from a power output terminal of the input power conversion device; and
   at least one axis actuation module installed on the base, wherein each of the at least one axis actuation module comprises:
      a motor;
      an axis power conversion device comprising an axis input terminal, a first output terminal and a second output terminal, wherein the axis input terminal receives the first voltage, the first voltage is converted into a second voltage with a rated voltage value by the axis power conversion device, and the second voltage is outputted from the first output terminal, wherein the second output terminal is directly connected with the axis input terminal, and the first voltage received by the axis input terminal is transmitted to the second output terminal; and
      a driving device electrically connected with the motor and the first output terminal, wherein the second voltage is converted into a third voltage by the driving device, and the third voltage is provided to the motor.

2. The robotic system according to claim 1, wherein the first voltage and the second voltage are DC voltages, and a magnitude of the first voltage is larger than a magnitude of the second voltage.

3. The robotic system according to claim 2, wherein the at least one axis actuation module comprises a plurality of axis actuation modules, wherein the axis input terminal of the axis power conversion device of one of the plurality of axis actuation modules is electrically connected with the power output terminal of the input power conversion device to receive the first voltage from the input power conversion device, and the axis input terminal of the axis power conversion device of each of the other axis actuation modules is electrically connected with the second output terminal of the previous axis actuation module.

4. The robotic system according to claim 2, wherein the axis power conversion device comprises a first buck converter, which is electrically connected between the axis input terminal and the first output terminal of the axis power conversion device, wherein after the first voltage from the axis input terminal is decreased to the second voltage by the first buck converter, the second voltage is outputted from the first output terminal.

5. The robotic system according to claim 2, wherein the axis power conversion device comprises a first boost converter, which is electrically connected between the axis input terminal and the first output terminal of the axis power conversion device, wherein when a first regeneration power is inputted into the first output terminal, the first regeneration power is converted into a second regeneration power by the first boost converter.

6. The robotic system according to claim 5, wherein the input voltage is an AC voltage and provided by an input power source, wherein the input power conversion device comprises a DC/AC converter, which is electrically connected between the power input terminal and the power output terminal of the input power conversion device, wherein if the second regeneration power from the first boost converter of the axis power conversion device and received by the power output terminal of the input power conversion device is larger than a threshold value, the second regeneration power is converted into a third regeneration power by the DC/AC converter and the third regeneration power is provided to the power input terminal of the input power conversion device, so that the third regeneration power is recycled to the input power source.

7. The robotic system according to claim 5, wherein the input voltage is provide by an energy storage battery, wherein the input power conversion device comprises a second buck converter, which is electrically connected between the power input terminal and the power output terminal of the input power conversion device, wherein if the second regeneration power from the first boost converter of the axis power conversion device of the axis actuation module and received by the power output terminal of the input power conversion device is larger than a threshold value, the second regeneration power is converted into a third regeneration power by the second buck converter, and the third regeneration power is provided to the power input terminal of the input power conversion device to charge the energy storage battery.

8. The robotic system according to claim 2, wherein the input voltage is an AC voltage, and the input power conversion device comprises an AC/DC converter and a second boost converter, wherein the AC/DC converter is electrically connected between the power input terminal of the input power conversion device and the second boost converter, and the input voltage from the power input terminal of the input power conversion device is converted into a transition DC voltage by the AC/DC converter, wherein the second boost converter is electrically connected between the AC/DC converter and the power output terminal of the input power conversion device, the transition DC voltage is converted into the first voltage by the second boost converter, and the first voltage is provided to the power output terminal of the input power conversion device, wherein the magnitude of the first voltage is equal to or larger than a magnitude of the transition DC voltage.

9. The robotic system according to claim 2, wherein the input voltage is a DC voltage, and the input power conversion device comprises a third boost converter, wherein the third boost converter is electrically connected between the power input terminal and the power output terminal of the input power conversion device, the input voltage from the power input terminal of the input power conversion device is converted into the first voltage by the third boost converter, and the first voltage is provided to the power output terminal of the input power conversion device, wherein the magnitude of the first voltage is equal to or larger than a magnitude of the input voltage.

* * * * *